(12) United States Patent
Yang (10) Patent No.: US 12,510,702 B2
(45) Date of Patent: Dec. 30, 2025

(54) DIFFRACTIVE OPTICAL WAVEGUIDE, AUGMENTED REALITY GLASSES, AND AUGMENTED REALITY DISPLAY DEVICE

(71) Applicant: HONOR DEVICE CO., LTD., Shenzhen (CN)

(72) Inventor: Hanning Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 322 days.

(21) Appl. No.: 18/269,678

(22) PCT Filed: Dec. 13, 2022

(86) PCT No.: PCT/CN2022/138768
§ 371 (c)(1),
(2) Date: Jun. 26, 2023

(87) PCT Pub. No.: WO2023/155570
PCT Pub. Date: Aug. 24, 2023

(65) Prior Publication Data
US 2024/0369753 A1    Nov. 7, 2024

(30) Foreign Application Priority Data

Feb. 16, 2022   (CN) .......................... 202210142611.4

(51) Int. Cl.
*G02B 27/01* (2006.01)
*F21V 8/00* (2006.01)

(52) U.S. Cl.
CPC ........... *G02B 6/0016* (2013.01); *G02B 6/005* (2013.01); *G02B 27/0172* (2013.01); *G02B 2027/0178* (2013.01)

(58) Field of Classification Search
CPC .................................................. G02B 27/0172
See application file for complete search history.

(56) References Cited

U.S. PATENT DOCUMENTS

| | | | |
|---|---|---|---|
| 8,162,524 | B2 | 4/2012 | Van Ostrand et al. |
| 11,067,812 | B2 | 7/2021 | Blomstedt et al. |

(Continued)

FOREIGN PATENT DOCUMENTS

| | | |
|---|---|---|
| CN | 102209919 A | 10/2011 |
| CN | 208314330 U | 1/2019 |

(Continued)

*Primary Examiner* — Edmond C Lau
(74) *Attorney, Agent, or Firm* — WOMBLE BOND DICKINSON (US) LLP (57) ABSTRACT

This application provides a diffractive optical waveguide, augmented reality glasses, and an augmented reality display device. The diffractive optical waveguide includes: a waveguide substrate and a plurality of functional regions located on a surface of the waveguide substrate. The functional regions include an in-coupling grating region, a turning region, and an out-coupling grating region. The turning region is arranged in parallel with the in-coupling grating region along a first direction. The out-coupling grating region is arranged in parallel with the turning region along a second direction. The first direction and second direction are perpendicular to each other. The turning region is provided with a plurality of elliptical through holes. The elliptical through holes are arranged at intervals and distributed in the turning region and penetrate from a top surface of the waveguide substrate to a bottom surface of the waveguide substrate.

20 Claims, 7 Drawing Sheets

(56) References Cited

U.S. PATENT DOCUMENTS

| | | | |
|---|---|---|---|
| 2007/0188837 A1* | 8/2007 | Shimizu | G02B 27/0172 359/13 |
| 2012/0120493 A1 | 5/2012 | Simmonds et al. | |
| 2017/0322426 A1* | 11/2017 | Tervo | G02B 27/4272 |
| 2021/0033879 A1 | 2/2021 | Liang | |
| 2021/0215941 A1* | 7/2021 | Schultz | G02B 27/0172 |
| 2021/0333551 A1* | 10/2021 | Schultz | G02B 30/34 |
| 2022/0197034 A1* | 6/2022 | Noui | G02B 26/0833 |

FOREIGN PATENT DOCUMENTS

| | | | | |
|---|---|---|---|---|
| CN | 210720883 U | 6/2020 | | |
| CN | 210835313 U | 6/2020 | | |
| CN | 111936911 A | 11/2020 | | |
| CN | 113115294 A | 7/2021 | | |
| CN | 113433694 A * | 9/2021 | ......... | G02B 27/0172 |
| CN | 113821113 A | 12/2021 | | |

\* cited by examiner

DIFFRACTIVE OPTICAL WAVEGUIDE, AUGMENTED REALITY GLASSES, AND AUGMENTED REALITY DISPLAY DEVICE

CROSS-REFERENCE TO RELATED APPLICATIONS

This application is a national stage of International Application No. PCT/CN2022/138768 filed on Dec. 13, 2022, which claims priority to Chinese Patent Application No. 202210142611.4 filed on Feb. 16, 2022. The disclosures of both of the aforementioned application are hereby incorporated by reference in their entireties.

TECHNICAL FIELD

This application relates to the technical field of display devices, and in particular to a diffractive optical waveguide, augmented reality glasses, and an augmented reality display device.

BACKGROUND

An augmented reality (Augmented Reality, AR) display technology is anew interactive display technology which overlays virtual information on the real world for human eyes to observe. At present, a relatively advanced optical transmission system to achieve the augmented reality technology is a diffractive optical waveguide transmission solution. A diffractive optical waveguide lens is the most critical component in the diffractive optical waveguide transmission solution. The diffractive optical waveguide lens mainly uses flat glass as a transmission body of a waveguide and has a grating waveguide structure of in-coupling, turning, and out-coupling. If optical display is implemented based on the diffractive optical waveguide lens, because diffraction gratings are all used in an in-coupling region, a turning region, and an out-coupling region in a waveguide lens surface, a micro projector optical machine needs to project an optical image into the in-coupling region for optical in-coupling, expand and bend the coupled optimal image in the turning region, and finally output an expanded and bent optimal image in the out-coupling region, so that human eyes may see the optical image.

Because diffraction efficiency of each diffraction grating is fixed, light is diffracted every time the light passes through the diffraction grating. Energy of the light becomes increasingly weaker during total reflection in an optical waveguide, greatly reducing energy of latterly diffracted light. Therefore, if a plurality of diffraction gratings exist, an emitted light utilization rate is finally reduced, further limiting display brightness of light that is incident to the human eyes and reducing use experience of a user.

SUMMARY

This application provides a diffractive optical waveguide, augmented reality glasses, and an augmented reality display device. By providing a plurality of elliptical through holes in a turning region, and reducing a quantity of gratings in the diffractive optical waveguide, dissipation of light energy during total reflection is prevented, and brightness of light that is incident to human eyes is increased.

According to a first aspect, this application provides a diffractive optical waveguide. The diffractive optical waveguide includes a waveguide substrate and a plurality of functional regions located on a surface of the waveguide substrate. The functional regions include an in-coupling grating region, a turning region, and an out-coupling grating region. The turning region is arranged in parallel with the in-coupling grating region along a first direction. The out-coupling grating region is arranged in parallel with the turning region along a second direction. The first direction and second direction are perpendicular to each other. The turning region is provided with a plurality of elliptical through holes. The elliptical through holes are arranged at intervals and distributed in the turning region and penetrate from a top surface of the waveguide substrate to a bottom surface of the waveguide substrate. A long axis of the elliptical through hole forms a first preset angle with the first direction, so that light that is incident to the waveguide substrate propagates along the waveguide substrate based on a preset path.

The structure of the diffractive optical waveguide provided in this application may be adapted to a scenario in which the user wears the augmented display glasses outdoors. By reducing the quantity of gratings in the diffractive optical waveguide, energy of light during total reflection in the optical waveguide is ensured. This improves brightness of light that is incident to human eyes while increasing the light utilization rate.

In an alternative implementation, a length of a plurality of elliptical through holes in the first direction is smaller than a length of the out-coupling grating region; and a length of the plurality of elliptical through holes in the second direction is greater than or equal to a width of the in-coupling grating region.

In an alternative implementation, a reflective inclined plane is disposed in the in-coupling grating region. The reflective inclined plane extends to an inside of the waveguide substrate along the surface of the waveguide substrate, and the reflective inclined plane forms a second preset angle with the first direction, so that light is coupled out of the out-coupling grating region after passing through the reflective inclined plane.

In an alternative implementation, in-coupling gratings are disposed in the in-coupling grating region, and a direction of grating diffraction fringes of the in-coupling gratings is perpendicular to the first direction. The in-coupling gratings are configured to couple light into the diffractive optical waveguide, so that light is coupled out of the out-coupling grating region after passing through the turning region.

In an alternative implementation, the second preset angle is 0° to 60°.

In an alternative implementation, a shape of the in-coupling grating region and a shape of the out-coupling grating region are any one of a square, a rectangle, a trapezoid, and a quadrangle.

In an alternative implementation, out-coupling gratings are disposed in the out-coupling grating region, and a direction of grating diffraction fringes of the out-coupling gratings is parallel to the first direction.

In an alternative implementation, the in-coupling gratings and the out-coupling gratings are holographic gratings or surface relief gratings.

In an alternative implementation, an etching depth of the in-coupling grating and an etching depth of the out-coupling grating are the same, and the etching depths are less than 800 nm.

In an alternative implementation, the in-coupling grating region and the out-coupling grating region are located on a same side or different sides of the surface of the waveguide substrate.

In an alternative implementation, the first preset angle is 90° to 180°.

In an alternative implementation, a length of a long axis of the elliptical through hole is 0.1 mm to 3 mm; and a length of a short axis of the elliptical through hole is 0.01 mm to 3 mm.

In an alternative implementation, an interval between the elliptical through holes in the first direction is 0 mm to 10 mm; and an interval between the elliptical through holes in the second direction is 0 mm to 2 mm.

According to a second aspect, this application provides augmented reality glasses. The augmented reality glasses further include a frame and support legs. One end of the support leg is connected to the frame, and the diffractive optical waveguide according to the first aspect is provided on the frame.

According to a third aspect, this application provides an augmented reality display device. The augmented reality display device includes a display and the diffractive optical waveguide according to the first aspect. The display corresponds to a position of the in-coupling grating region of the diffractive optical waveguide.

It may be known, from the foregoing solution, that this application provides a diffractive optical waveguide, augmented reality glasses, and an augmented reality display device. The diffractive optical waveguide includes: a waveguide substrate and a plurality of functional regions located on a surface of the waveguide substrate. The functional regions include an in-coupling grating region, a turning region, and an out-coupling grating region. The turning region is arranged in parallel with the in-coupling grating region along a first direction. The out-coupling grating region is arranged in parallel with the turning region along a second direction. The first direction and second direction are perpendicular to each other. The turning region is provided with a plurality of elliptical through holes. The elliptical through holes are arranged at intervals and distributed in the turning region and penetrate from a top surface of the waveguide substrate to a bottom surface of the waveguide substrate. A long axis of the elliptical through hole forms a first preset angle with the first direction, so that light that is incident to the waveguide substrate propagates along the waveguide substrate based on a preset path. This resolves a problem that an emitted light utilization rate is reduced, further limiting brightness of light that is incident to human eyes, if there are a plurality of diffractive gratings.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. Other embodiments obtained by a person of ordinary skill in the art based on embodiments of this application without creative efforts shall fall within the protection scope of this application.

Terms used in the following embodiments are only intended to describe particular embodiments, and are not intended to limit this application. As used in this specification of this application and the appended claims, singular expressions "one", "a", "the", "the foregoing", and "this" are intended to also include, for example, an expression "one or more" unless expressly indicated to the contrary in the context. It should be further understood that in the following embodiments of this application, "at least one" and "one or more" refer to one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects before and after the character.

A diffractive optical waveguide shown in embodiments of this application may be applied to display devices. The display devices include but are not limited to mobile terminals or fixed terminals with the diffractive optical waveguide such as augmented reality (Augmented Reality, AR) glasses, a head up display (Head Up Display, HUD), and a virtual reality device. This is not limited in embodiments of this application. To facilitate subsequent description, the augmented reality (Augmented Reality, AR) glasses are used as an example for subsequent description in this application.

Figure 1:
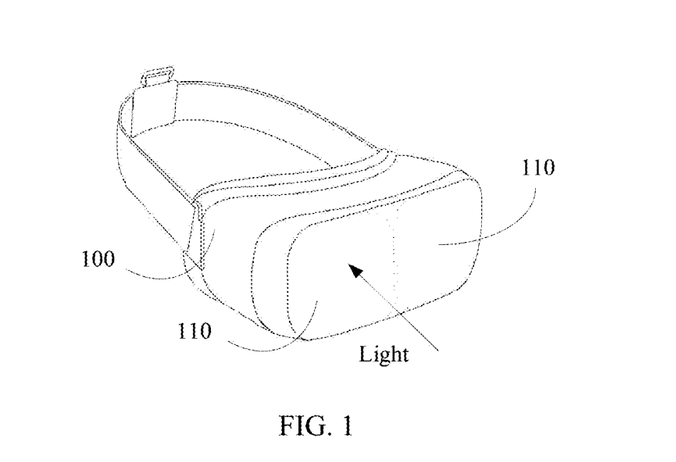
FIG. 1 shows an example of a schematic diagram of a scenario of augmented reality glasses.

FIG. 1 shows an example of a schematic diagram of a scenario of augmented reality glasses. Refer to FIG. 1. The augmented reality glasses include a glasses support 100 and two diffractive optical waveguide lenses 110 disposed on the glasses support. The two diffractive optical waveguide lenses 110 are fastened to the glasses support 100. The two diffractive optical waveguide lenses are in a one-to-one correspondence with eyes of a user (a wearer of the augmented reality glasses). In such image of the augmented reality glasses using a principle of a diffractive optical waveguide, the diffractive optical waveguide lenses may be regarded as lenses of the augmented reality glasses. When the user wears the augmented reality glasses, light (a virtual image) emitted by a micro projector optical machine vertically irradiates the diffractive optical waveguide lenses and projects to entrance pupils of human eyes, and is superimposed with real space, to form a real and imaginary display effect. This provides the user with vivid display experience by virtue of human-computer interaction and rich imagination space of the augmented reality glasses.

Figure 2:
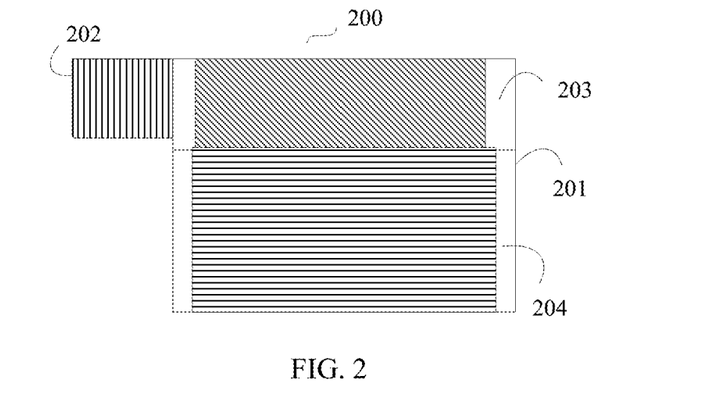
FIG. 2 shows an example of a schematic plan view of a typical diffractive optical waveguide.

FIG. 2 shows an example of a schematic plan view of a typical diffractive optical waveguide. Refer to FIG. 2. A typical diffractive optical waveguide 200 includes a waveguide substrate 201, an in-coupling region 202, a turning region 203, and an out-coupling region 204. The in-coupling region 202, the turning region 203, and the out-coupling region 204 are all disposed on a same side of a surface of the waveguide substrate 201. The in-coupling region 202, the turning region 203, and in-coupling gratings, turning gratings, and out-coupling gratings are successively disposed in the out-coupling region 204. A working principle of the typical diffractive optical waveguide is as follows: Light projected by a micro projector optical machine is vertically projected to the in-coupling grating, light from the in-coupling grating is coupled into the diffractive optical waveguide and propagates to the turning grating in the form of total internal reflection, and the turning grating turns and propagates the coupled light in a horizontal or vertical direction, and turns the turned and propagated light to the out-coupling grating. The out-coupling grating further emits the turned light to human eyes in a vertical or horizontal direction. The emitted light finally enters human eyes to be observed.

Sources of light include, but are not limited to, projection by the micro projector optical machine, and may alternatively come from a micro electro mechanical system (Micro Electro Mechanical System, MEMS), a digital micro-mirror device (Digital Micro-mirror Device, DMD), digital light processing (Digital Light Processing, DLP), a liquid crystal on silicon (Liquid Crystal On Silicon, LCOS), a laser beam scanning (Laser Beam Scanning, LBS), an organic light-emitting diode (Organic Light-Emitting Diode, OLED), or another micro-display. Light emitted by a light source may be visible light between 380 nm and 760 nm.

If a user wears the augmented reality glasses outdoors, a demand for the augmented reality glasses is relatively high, and higher brightness of light that is incident to human eyes is required, to increase use experience of the user when wearing the augmented reality glasses outdoors. However, because diffraction efficiency of each diffraction grating is fixed, light is diffracted every time the light passes through the diffraction grating. Energy of the light becomes increasingly weaker during total reflection in an optical waveguide, greatly reducing energy of latterly diffracted light. Therefore, because a plurality of diffraction gratings exist in the typical diffractive optical waveguide, an emitted light utilization rate is finally reduced, further limiting display brightness of the light that is incident to human eyes and reducing use experience of the user.

Therefore, to optimize a structure of the typical diffractive optical waveguide provided in the foregoing embodiment, this application provides a diffractive optical waveguide. The diffractive optical waveguide provided in this application may be used in the augmented reality glasses, so that display brightness of the augmented reality glasses in human eyes can be increased.

Embodiment 1

Figure 3:
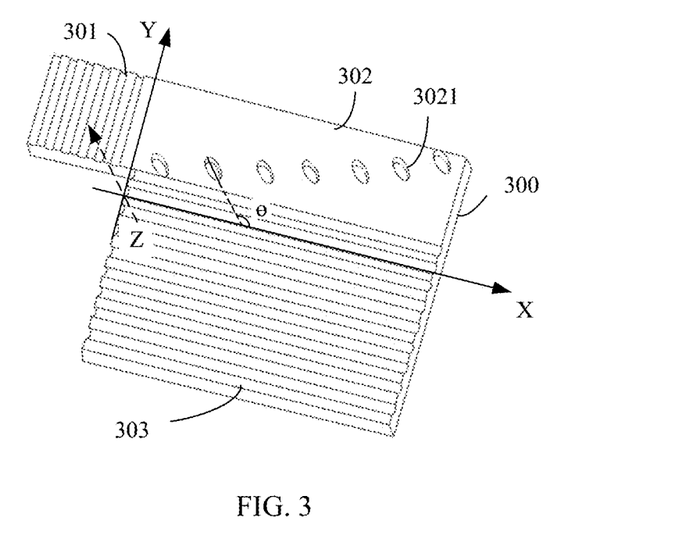
FIG. 3 shows an example of a schematic perspective view of a diffractive optical waveguide according to this application.

FIG. 3 shows an example of a schematic perspective view of a diffractive optical waveguide according to this application. Refer to FIG. 3. The diffractive optical waveguide provided in this application includes a waveguide substrate 300 and a plurality of functional regions located in the waveguide substrate 300. The functional regions include an in-coupling grating region 301, a turning region 302, and an out-coupling grating region 303. The turning region 302 is arranged in parallel with the in-coupling grating region 301 along a first direction, and the out-coupling grating region 303 is arranged in parallel with the turning region 302 along a second direction. The first direction and second direction are perpendicular to each other. The turning region 302 is disposed between the in-coupling grating region 301 and the out-coupling grating region 303. The in-coupling grating region 301 and the out-coupling grating region 303 are disposed on a same side of a surface of the waveguide substrate, and are both disposed on a top surface of the waveguide substrate 300.

In some embodiments, a shape of the in-coupling grating region 301 and a shape of the out-coupling grating region 303 are any one of a square, a rectangle, a trapezoid, and a quadrangle.

To further describe a structure of the diffractive optical waveguide, a two-dimensional plane coordinate system with the first direction as an X axis and the second direction as a Y axis is further established in FIG. 3. In the plane coordinate system, the turning region 302 is arranged in parallel with the in-coupling grating region 301 along a positive direction of the X axis, and the out-coupling grating region 303 is arranged in parallel with the turning region 302 along a negative direction of the Y axis.

Light projected by a micro projector optical machine is vertically projected to the diffractive optical waveguide. A direction perpendicular to the diffractive optical waveguide is a Z axis. The turning region 302 is provided with a plurality of elliptical through holes 3021. The plurality of elliptical through holes 3021 are disposed along the Z axis. The plurality of elliptical through holes 3021 are arranged at intervals and distributed in the turning region 302. The elliptical through holes 3021 entirely penetrate the waveguide substrate 300. Specifically, the elliptical through holes 3021 penetrate from the top surface of the waveguide substrate 300 to a bottom surface of the waveguide substrate 300.

A long axis of the elliptical through hole 3021 forms a first preset angle with a positive direction and a negative direction of the X axis, so that light that is incident to the waveguide substrate propagates along the waveguide substrate 300 based on a preset path. Specifically, there is an included angle θ between the long axis of the elliptical through hole 3021 and the positive direction and negative direction of the X axis, and the included angle θ ranges from 90° to 180°.

In some embodiments, a length of a long axis of the elliptical through hole is preferably 0.1 mm to 3 mm, and a length of a short axis of the elliptical through hole is preferably 0.01 mm to 3 mm. An interval between the elliptical through holes 3021 in the first direction (X axis) is preferably 0 mm to 10 mm, and an interval between the elliptical through holes 3021 in the second direction (Y axis)

is preferably 0 mm to 2 mm. A length of a plurality of elliptical through holes 3021 in the first direction (X axis) is smaller than a length of the out-coupling grating region 303, and a length of the plurality of elliptical through holes 3021 in the second direction (Y axis) is greater than or equal to a width of the in-coupling grating region 301. It should be noted that a width of the long axis and a width of the short axis of the elliptical through hole and a length of all elliptical through holes in the first direction and a length of all elliptical through holes in the second direction may be set based on an actual situation, which is not specifically limited in this application.

Figure 4:
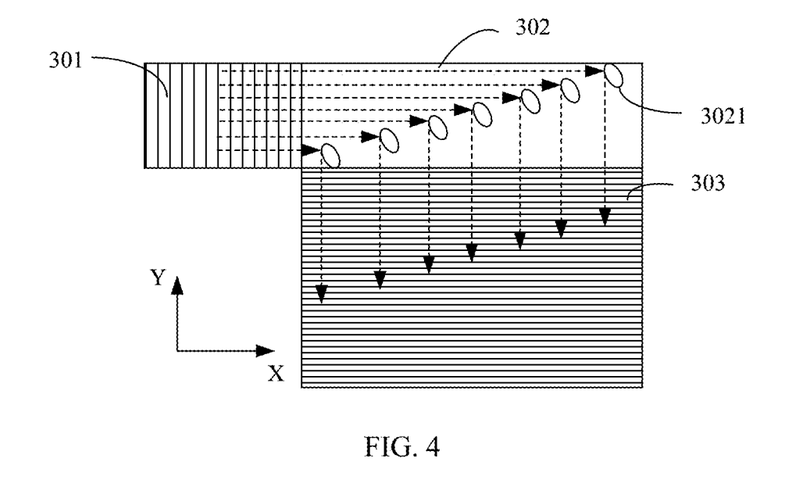
FIG. 4 shows an example of a schematic top view of a diffractive optical waveguide according to this application.

FIG. 4 shows an example of a schematic top view of a diffractive optical waveguide according to this application. Refer to FIG. 4. In-coupling gratings are disposed in the in-coupling grating region 301. A direction of grating diffraction fringes of the in-coupling gratings is perpendicular to an X axis. The in-coupling gratings are configured to couple light into the diffractive optical waveguide, so that light is coupled out of the out-coupling grating after passing through the turning region 302. The out-coupling gratings are disposed in an out-coupling grating region 303, and a direction of grating diffraction fringes of the out-coupling gratings is parallel to the X axis.

In some embodiments, the in-coupling gratings and the out-coupling gratings are holographic gratings or surface relief gratings. In addition, an etching depth of the in-coupling grating and an etching depth of the out-coupling grating are the same, and the etching depths are preferably less than 800 nm.

For example, in this application, all optical elements used in the in-coupling grating region 301 and the out-coupling grating region 303 may be the holographic gratings or surface relief gratings, or a combination of the holographic gratings and surface relief gratings. For example, the holographic gratings are used in the in-coupling grating region 301, and the surface relief gratings are used in the out-coupling grating region 303. For another example, the surface relief gratings are used in the in-coupling grating region 301, and the holographic gratings are used in the out-coupling grating region 303. A grating period of the surface relief gratings and a grating period of the holographic gratings are in submicron order.

In this application, by replacing traditional refractive elements with the surface relief gratings with a sub-wavelength scale as the optical elements in the in-coupling grating region 301 and the optical elements in the out-coupling grating region 303 in the optical waveguide, a micro-structure of the surface relief gratings may be convex or concave relative to a waveguide surface, achieving modulation of light beams. The surface relief gratings are a periodically changing structure generated on the surface, that is, various periodic grooves formed on the surface. Based on different structural parameters such as an outline, a shape, and an angle of inclination of the grooves, the surface relief gratings include a rectangular grating, a trapezoidal grating, an inclined grating, and the like.

In some embodiments, the optical elements in the out-coupling grating region 303 couple light beams propagating in waveguide lenses out to human eyes. Based on a difference in an optical element for a light beam in the in-coupling grating region 301 and an optical element for a light beam in the out-coupling grating region 303, the in-coupling grating region 301 may be a reflecting mirror, a prism, a surface relief grating, a holographic grating, and the like. The out-coupling grating region 303 may be an array-type semi-transmitting semi-reflecting mirror, surface relief gratings, holographic gratings, and the like. It should be noted that the optical elements used in the in-coupling grating region 301 and the optical elements used in the out-coupling grating region 303 are not specifically limited in this application, and may be designed based on an actual situation.

Still refer to FIG. 4. Based on a structure of the diffractive optical waveguide provided in this application, light (a virtual image) emitted by a micro projector optical machine vertically irradiates an inside of the in-coupling grating region 301. A diffractive in-coupling grating in the in-coupling grating region 301 diffracts incident light in a positive direction of the X axis. Diffracted light is totally reflected and transmitted in the optical waveguide along the positive direction of the X axis. The diffracted light is reflected and transmitted to hole walls of the plurality of elliptical through holes 3021 in the turning region 302, and the elliptical through holes 3021 reflect the reflected light again, so that the light propagates to the out-coupling grating in the out-coupling grating region 303 in a negative direction of a Y axis. The out-coupling grating diffracts the light and then vertically emits the light out to the human eyes. Because a grating fringe of the out-coupling grating is parallel to the X axis and filled in the out-coupling grating region 303, a large-area eye moving range may be achieved through the structure of the diffractive optical waveguide in this application.

Figure 5:
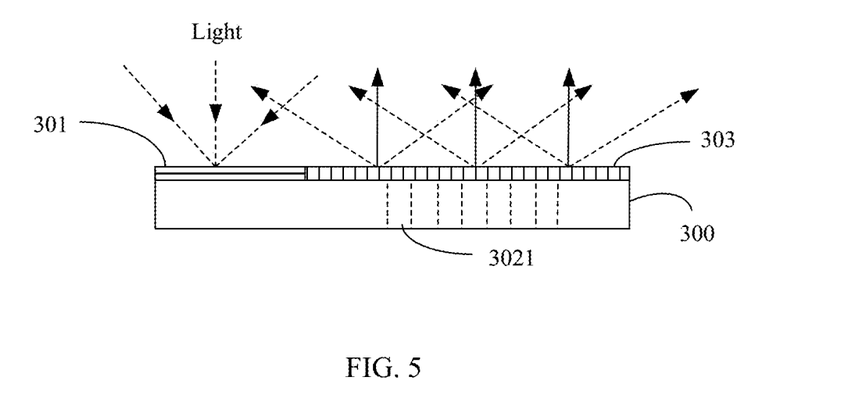
FIG. 5 shows an example of a schematic sectional view of a diffractive optical waveguide according to this application.

FIG. 5 shows an example of schematic sectional view of a diffractive optical waveguide according to this application. The diffractive optical waveguide may also be a reflective diffractive optical waveguide. An in-coupling grating region 301 and an out-coupling grating region 303 of the reflective diffractive optical waveguide are located on a same side of the diffractive optical waveguide. The in-coupling grating region 301 and the out-coupling grating region 303 are located on a same side of a surface of a waveguide substrate 300. FIG. 5 further shows an optical path characteristic of the reflective diffractive optical waveguide. Light emitted by a micro projector optical machine vertically irradiates an inside of an in-coupling grating in the in-coupling grating region 301, and the in-coupling grating performs total reflection and transmission of the light. Finally, diffracted light is reflected to the out-coupling grating in the out-coupling grating region 303, and the out-coupling grating diffracts the light and vertically outputs the light, so that human eyes can see an optical image corresponding to the light.

Figure 6:
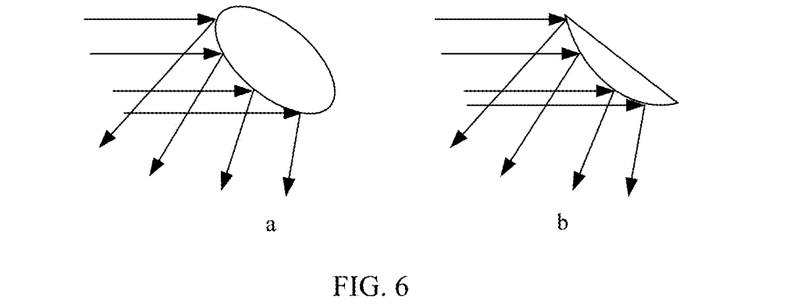
FIG. 6 shows an example of a schematic sectional view of an elliptical through hole according to this application.

FIG. 6 shows an example of a schematic sectional view of an elliptical through hole according to this application. A side, close to an in-coupling grating region 301, of the elliptical through hole 3021 is elliptical or circular. A side, away from the in-coupling grating region 301, of the elliptical through hole 301 is elliptical, circular, or planar. Refer to a view a of FIG. 6 and view b of FIG. 6. Light emitted by a micro projector optical machine is totally reflected from the in-coupling grating region 301 to an arc hole wall of the elliptical through hole 3021, and then reflected light is reflected on a surface of the arc hole wall of the elliptical through hole 3021. Because a reflecting surface corresponding to the arc hole wall of the elliptical through hole 3021 is a convex arc, the elliptical through hole 3021 may diffuse reflected light, and then expand and transmit incident light to the out-coupling grating region 303.

Figure 7:
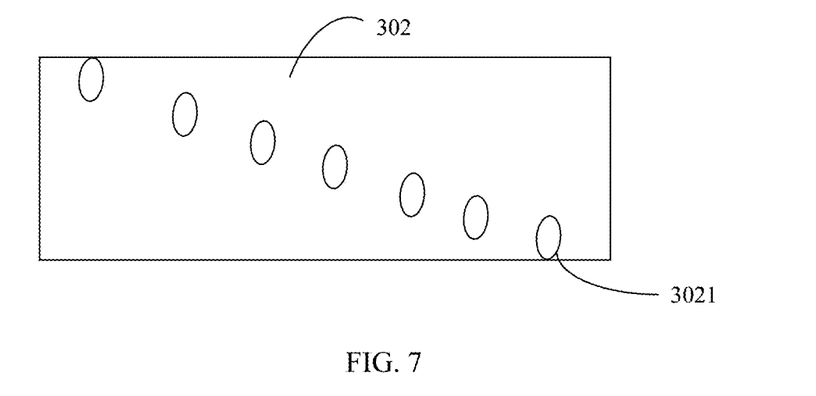
FIG. 7 shows an example of a distribution of an array of elliptical through holes according to this application.
Figure 8:
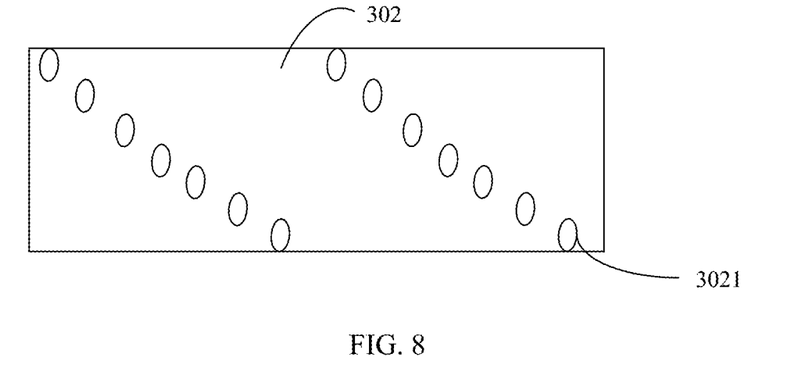
FIG. 8 shows an example of another distribution of an array of elliptical through holes according to this application.

In some embodiments, a plurality of elliptical through holes 3021 are arranged at intervals and distributed in a turning region 302. Arrangement at intervals and distribution of the elliptical through holes 3021 are not limited to extending from a lower left corner to an upper right corner of the turning region 302 along a diagonal direction. FIG. 7 shows an example of a distribution of an array of elliptical through holes according to this application. Refer to FIG. 7. Distribution of the array of the elliptical through holes 3021 may be extending from an upper left corner to a lower right corner of the turning region 302 along a diagonal direction. FIG. 8 shows an example of another distribution of an array of elliptical through holes according to this application. Refer to FIG. 8. Distribution of the array of the elliptical through holes 3021 may be distribution in two arrays. For example, two groups of the elliptical through holes 3021 are extended from an upper left corner to a lower right corner of the turning region 302 along a diagonal direction. It should be noted that a specific form of the distribution of the array of the elliptical through holes 3021 is not specifically limited in this application, which may be designed according to an actual demand.

It may be known, from the foregoing embodiment, that the diffractive optical waveguide provided in this embodiment is provided with the plurality of elliptical through holes 3021 in the turning region 302, to prevent a plurality of gratings from existing in the diffractive optical waveguide, reducing a light utilization rate. The reflected light is diffused through the plurality of elliptical through holes 3021, and then the incident light is expanded and transmitted, improving brightness of light that is incident to human eyes.

Embodiment 2

Figure 9:
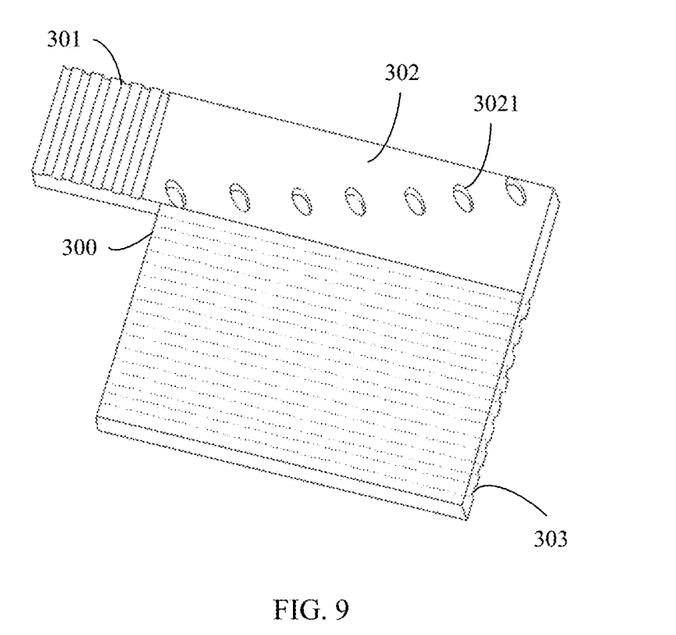
FIG. 9 shows an example of another schematic perspective view of a diffractive optical waveguide according to this application.

FIG. 9 shows an example of another schematic perspective view of a diffractive optical waveguide according to this application. Refer to FIG. 9. The diffractive optical waveguide provided in this application includes a waveguide substrate 300 and a plurality of functional regions located in the waveguide substrate 300. The functional regions include an in-coupling grating region 301, a turning region 302, and an out-coupling grating region 303. The turning region 302 is arranged in parallel with the in-coupling grating region 301 along a first direction, and the out-coupling grating region 303 is arranged in parallel with the turning region 302 along a second direction. The first direction and second direction are perpendicular to each other. The turning region 302 is disposed between the in-coupling grating region 301 and the out-coupling grating region 303. The in-coupling grating region 301 and the out-coupling grating region 303 are disposed on different sides of a surface of the waveguide substrate. Specifically, the in-coupling grating region 301 is disposed on a top surface of the waveguide substrate, and the out-coupling grating region 303 is disposed on a bottom surface of the waveguide substrate. Further, in-coupling gratings are disposed on the top surface of the waveguide substrate, and out-coupling gratings are disposed on the bottom surface of the waveguide substrate.

The turning region 302 is provided with a plurality of elliptical through holes 3021. The plurality of elliptical through holes 3021 are arranged at intervals and distributed in the turning region 302. The elliptical through holes 3021 entirely penetrate the waveguide substrate 300. Specifically, the elliptical through holes 3021 penetrate from the top surface of the waveguide substrate 300 to a bottom surface of the waveguide substrate 300. Other settings related to the elliptical through holes 3021, a structure of the in-coupling gratings, and a structure of the out-coupling gratings are the same as those in the foregoing embodiment. The details are not described here again.

Figure 10:
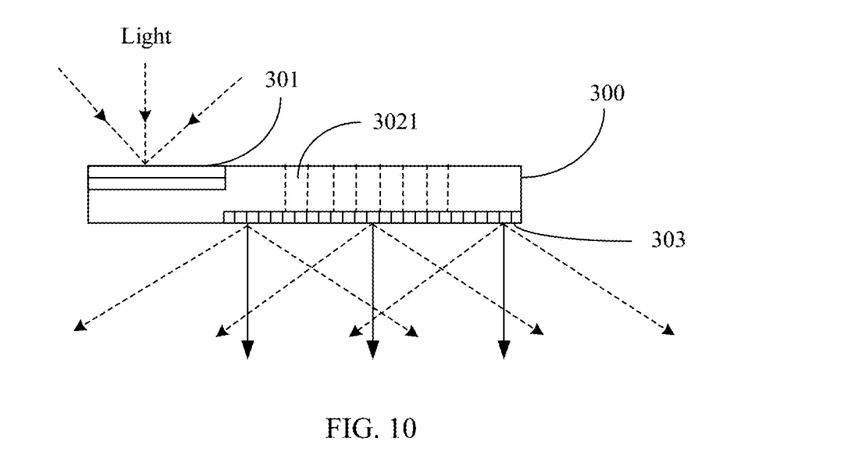
FIG. 10 shows an example of another schematic sectional view of a diffractive optical waveguide according to this application.

FIG. 10 shows an example of another schematic sectional view of a diffractive optical waveguide according to this application. The diffractive optical waveguide provided in this application may be a transmitting diffractive optical waveguide. An in-coupling grating region 301 and an out-coupling grating region 303 of the transmitting diffractive optical waveguide are located at two opposite sides of the diffractive optical waveguide. FIG. 10 further shows an optical path characteristic of the transmitting diffractive optical waveguide. Because the in-coupling grating region 301 and the out-coupling grating region 303 are disposed on different sides of a surface of a waveguide substrate, an input direction and an output direction of light are different from those in the foregoing embodiment. The in-coupling grating region 301 and the out-coupling grating region 303 are located on different sides of the surface of the waveguide substrate. Light emitted by a micro projector optical machine vertically irradiates an inside of the in-coupling grating in the in-coupling grating region 301, and the in-coupling grating performs total reflection and transmission of the light. Finally, diffracted light is reflected to the out-coupling grating in the out-coupling grating region 303, and the out-coupling grating diffracts the light and vertically outputs the light.

It may be known, from the foregoing embodiment, that the in-coupling grating region 301 and the out-coupling grating region 303 in the diffractive optical waveguide provided in this embodiment are located on different sides of the surface of the waveguide substrate, and a plurality of elliptical through holes 3021 are disposed in a turning region 302. This ensures energy of light during total reflection while increasing brightness of light that is incident to human eyes.

Embodiment 3

Figure 11:
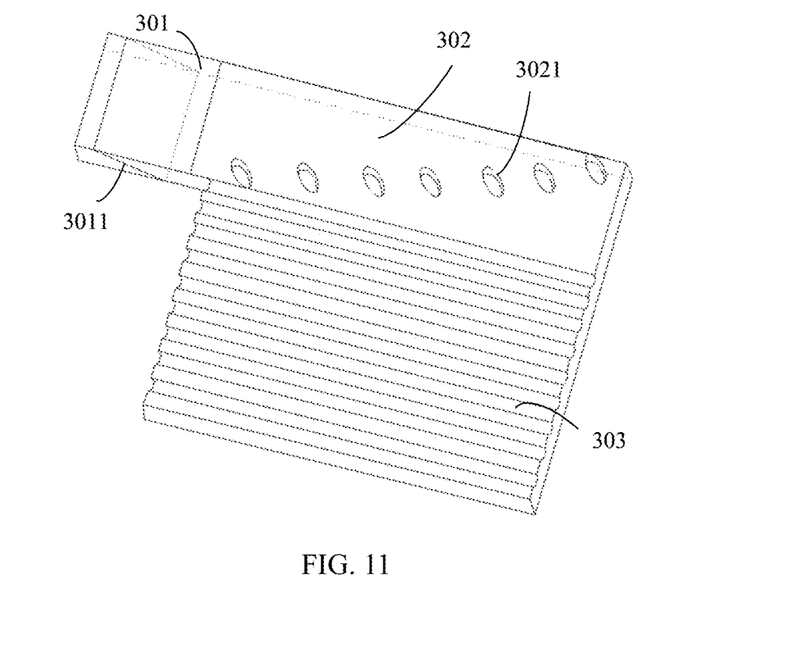
FIG. 11 shows an example of another schematic perspective view of a diffractive optical waveguide according to this application.

FIG. 11 shows an example of another schematic perspective view of a diffractive optical waveguide according to this application. Refer to FIG. 11. The diffractive optical waveguide provided in this application includes a waveguide substrate 300 and a plurality of functional regions located in the waveguide substrate 300. The functional regions include an in-coupling grating region 301, a turning region 302, and an out-coupling grating region 303. The turning region 302 is arranged in parallel with the in-coupling grating region 301 along a first direction, and the out-coupling grating region 303 is arranged in parallel with the turning region 302 along a second direction. The first direction and second direction are perpendicular to each other. The turning region 302 is disposed between the in-coupling grating region 301 and the out-coupling grating region 303. The in-coupling grating region 301 and the out-coupling grating region 303 are disposed on a same side of a surface of the waveguide substrate. Specifically, the in-coupling grating region 301 and the out-coupling grating region 303 are both disposed on a top surface of the waveguide substrate.

A reflective inclined plane 3011 is disposed in the in-coupling grating region 301. The reflective inclined plane 3011 extends to an inside of the waveguide substrate along a surface of the waveguide substrate, and the reflective inclined plane 3011 forms a preset angle with the surface of the waveguide substrate, so that light that is incident to the waveguide substrate 300 propagates along the waveguide substrate 300 based on a preset path.

The turning region 302 is provided with a plurality of elliptical through holes 3021. The plurality of elliptical through holes 3021 are arranged at intervals and distributed in the turning region 302. The elliptical through holes 3021 entirely penetrate the waveguide substrate 300. Specifically, the elliptical through holes 3021 penetrate from the top surface of the waveguide substrate 300 to a bottom surface of the waveguide substrate 300.

Out-coupling gratings are disposed in the out-coupling grating region 303. Other settings related to the elliptical through holes 3021 and a structure of the out-coupling gratings are the same as those in the foregoing first embodiment. The details are not described here again.

Figure 12:
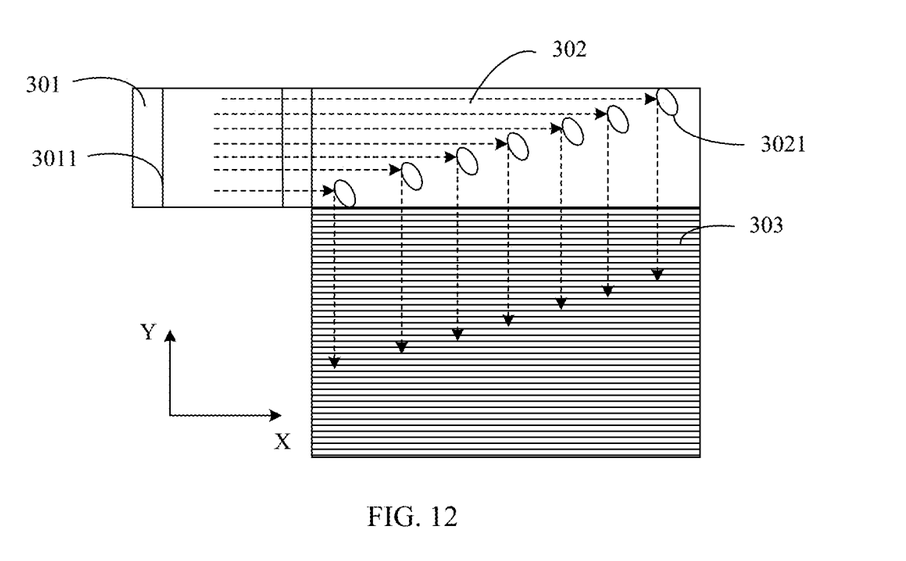
FIG. 12 shows an example of another schematic plan view of a diffractive optical waveguide according to this application.

FIG. 12 shows an example of another schematic plan view of a diffractive optical waveguide according to this application. Refer to FIG. 12. Light (a virtual image) emitted by a micro projector optical machine vertically irradiates an inside of the in-coupling grating region 301. The reflective inclined plane 3011 in the in-coupling grating region 301 diffracts incident light in a positive direction of an X axis. Diffracted light is totally reflected and transmitted in the optical waveguide along the positive direction of the X axis. The diffracted light is reflected and transmitted to hole walls of the plurality of elliptical through holes 3021 in the turning region 302, and the elliptical through holes 3021 reflect the reflected light again, so that the light propagates to the out-coupling grating in the out-coupling grating region 303 in a negative direction of a Y axis. The out-coupling grating diffracts the light and then vertically emits the light out to the human eyes.

Figure 13:
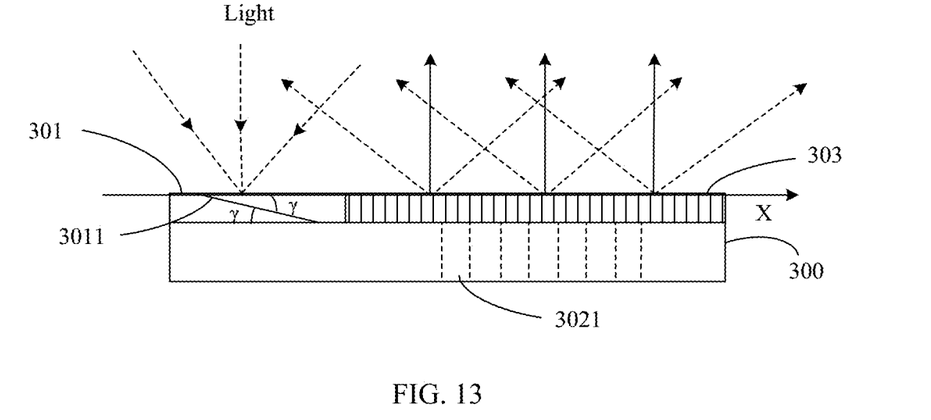
FIG. 13 shows an example of another schematic sectional view of a diffractive optical waveguide according to this application.

FIG. 13 shows an example of another schematic sectional view of a diffractive optical waveguide according to this application. Specifically, the reflective inclined plane 3011 in the in-coupling grating region 301 and the out-coupling gratings in the out-coupling grating region 303 are located on a same side of the diffractive optical waveguide. FIG. 13 further shows an optical path characteristic of the diffractive optical waveguide. The in-coupling grating region 301 and the out-coupling grating region 303 are located on a same side of a surface of a waveguide substrate. Light emitted by the micro projector optical machine vertically irradiates an inside of the in-coupling grating in the in-coupling grating region 301, and the reflective inclined plane 3011 performs total reflection and transmission of the light. Finally, diffracted light is reflected to the out-coupling grating in the out-coupling grating region 303, and the out-coupling grating diffracts the light and vertically outputs the light, so that human eyes can see an optical image corresponding to the light.

In some embodiments, the reflective inclined plane 3011 extends obliquely from the surface of the waveguide substrate 300 to an inside of the waveguide substrate 300 along a first direction. The reflective inclined plane 3011 forms a second preset angle with the first direction. Specifically, refer to FIG. 13, there is an included angle γ between the reflective inclined plane 3011 and a positive direction of an X axis, and the included angle γ ranges from 0° to 60°.

It may be known, from the foregoing embodiment, that the in-coupling grating region 301 and the out-coupling grating region 303 in the diffractive optical waveguide provided in this embodiment are located on a same side of a surface of the waveguide substrate. The in-coupling grating region 301 is disposed in the reflective inclined plane 3011, and the turning region 302 is provided with a plurality of elliptical through holes 3021. Light vertically irradiates the reflective inclined plane 3011, and the reflective inclined plane 3011 totally reflects and transmits the light. Finally, diffracted light is reflected to the out-coupling grating, and the out-coupling grating diffracts the light and vertically outputs the light. By reducing a quantity of gratings in the diffractive optical waveguide, dissipation of light energy during total reflection is prevented, and brightness of light that is incident to human eyes is increased.

Embodiment 4

Figure 14:
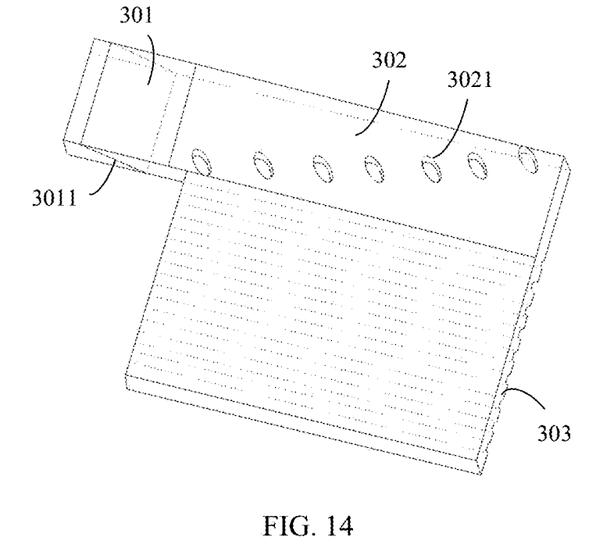
FIG. 14 shows an example of another schematic perspective view of a diffractive optical waveguide according to this application.

FIG. 14 shows an example of another schematic perspective view of a diffractive optical waveguide according to this application. Refer to FIG. 14. The diffractive optical waveguide provided in this application includes a waveguide substrate 300 and a plurality of functional regions located in the waveguide substrate 300. The functional regions include an in-coupling grating region 301, a turning region 302, and an out-coupling grating region 303. The turning region 302 is arranged in parallel with the in-coupling grating region 301 along a first direction along the in-coupling grating region 301. The out-coupling grating region 303 is arranged in parallel with the turning region 302 along a second direction. The first direction and second direction are perpendicular to each other. The turning region 302 is disposed between the in-coupling grating region 301 and the out-coupling grating region 303. The in-coupling grating region 301 and the out-coupling grating region 303 are disposed on different sides of a surface of the waveguide substrate. Specifically, the in-coupling grating region 301 is disposed on a top surface of the waveguide substrate, and the out-coupling grating region 303 is disposed on a bottom surface of the waveguide substrate.

A reflective inclined plane 3011 is disposed in the in-coupling grating region 301. The reflective inclined plane 3011 extends to an inside of the waveguide substrate along a surface of the waveguide substrate, and the reflective inclined plane 3011 forms a preset angle with the surface of the waveguide substrate, so that light that is incident to the waveguide substrate 300 propagates along the waveguide substrate 300 based on a preset path.

The turning region 302 is provided with a plurality of elliptical through holes 3021. The plurality of elliptical through holes 3021 are arranged at intervals and distributed in the turning region 302. The elliptical through holes 3021 entirely penetrate the waveguide substrate 300. Specifically, the elliptical through holes 3021 penetrate from the top surface of the waveguide substrate 300 to a bottom surface of the waveguide substrate 300.

Out-coupling gratings are disposed in the out-coupling grating region 303. Other settings related to the elliptical through holes 3021, a structure of the out-coupling gratings, and the reflective inclined plane 3011 are the same as those in Embodiment 4. The details are not described here again.

Figure 15:
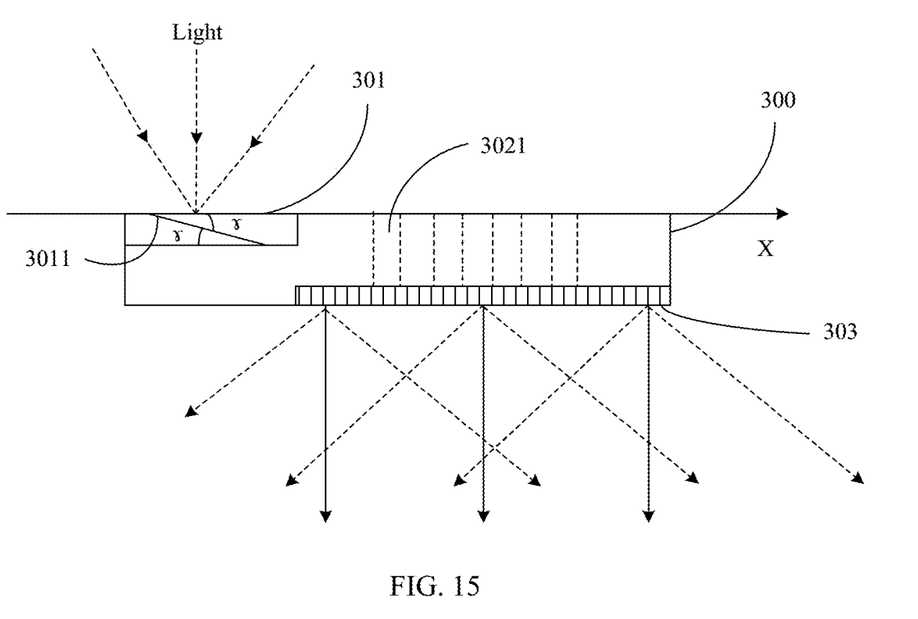
FIG. 15 shows an example of another schematic sectional view of a diffractive optical waveguide according to this application.

FIG. 15 shows an example of another schematic sectional view of a diffractive optical waveguide according to this application. Specifically, the reflective inclined plane 3011 in the in-coupling grating region 301 and the out-coupling gratings in the out-coupling grating region 303 are located on different sides of the diffractive optical waveguide. FIG. 15 further shows an optical path characteristic of the diffractive optical waveguide. The in-coupling grating region 301 and the out-coupling grating region 303 are located on different sides of the surface of the waveguide substrate. Light emitted by the micro projector optical machine vertically irradiates an inside of the in-coupling grating in the in-coupling grating region 301, and the reflective inclined plane 3011 performs total reflection and transmission of the light. Finally, diffracted light is reflected to the out-coupling grating in the out-coupling grating region 303, and the out-coupling grating diffracts the light and vertically outputs the light.

It may be known, from the foregoing embodiment, that the in-coupling grating region 301 and the out-coupling grating region 303 in the diffractive optical waveguide provided in this embodiment are located on different sides of a surface of the waveguide substrate. The in-coupling grating region 301 is disposed in the reflective inclined plane 3011, and the turning region 302 is provided with a plurality of elliptical through holes 3021. Because only one out-coupling grating exists in the diffractive optical waveguide, energy of light during total reflection in the optical waveguide is ensured. This increases brightness of light that is incident to human eyes and improves use experience of a user.

In some embodiments, the waveguide substrate 300 provided in this application is glass or an organic material with a high refractive index. The refractive index of the waveguide substrate 300 preferably ranges from 1.7 to 2.5.

In some embodiments, an optical waveguide with a surface relief grating optical waveguide is achieved by processing a grating structure with a micro-nano scale on a surface of a glass substrate with a high refractive index. A holographic diffractive optical waveguide is also a layer with a graded index on a surface of a substrate with a high refractive index. Therefore, when a combination of waveguide lenses of the two diffractive optical waveguides is completed, a separate glass cover plate or a structural layer is to be added for face-to-face combination, to protect the structural layer on a surface of the diffractive optical waveguide. In addition, during combination, an air spacer is to be added between optical waveguides, to prevent the structural layer from contacting another structural surface or glass surface.

Therefore, protective layers are further disposed on a top end surface and a bottom end surface of the waveguide substrate 300 of the diffractive optical waveguide provided in this application, and entire surfaces or entire frames of the waveguide substrate 300 are bonded to the protective layers by an optical adhesive with a low refractive index. The waveguide substrate 300 is protected by high-strength glass or a high-strength organic matter.

It may be known, from the foregoing solution, that four structures of the diffractive optical waveguide are proposed in this application. The in-coupling gratings or the reflective inclined plane 3011 are disposed in the in-coupling grating region 301. The turning region 302 is provided with a plurality of elliptical through holes 3021. The out-coupling gratings are disposed in the out-coupling grating region 303. The structure of the diffractive optical waveguide provided in this application may be adapted to a scenario in which the user wears the augmented display glasses outdoors. By reducing the quantity of gratings in the diffractive optical waveguide, energy of light during total reflection in the optical waveguide is ensured. This improves brightness of light that is incident to human eyes while increasing the light utilization rate.

In some embodiments, this application further provides augmented reality glasses. The augmented reality glasses include a frame and support legs. One end of the support leg is connected to the frame, and the diffractive optical waveguide provided in the first embodiment to the fourth embodiment is provided on the frame.

In some embodiments, this application further provides an augmented reality display device. The augmented reality display device may be a wearable device such as VR glasses and/or AR glasses. The augmented reality display device includes a display and the diffractive optical waveguide provided in the first embodiment to the fourth embodiment. The display corresponds to a position of the in-coupling grating region 301 of the diffractive optical waveguide. The diffractive optical waveguide is configured to receive light emitted by a light source.

A person skilled in the art can easily figure out another implementation solution of this application after considering this specification and practicing this application that is disclosed herein. This application is intended to cover any variations, functions, or adaptive changes of this application. These variations, functions, or adaptive changes comply with general principles of this application, and include common knowledge or a commonly used technical means in the technical field that is not disclosed in this application. This specification and the embodiments are merely considered as examples, and the actual scope and the spirit of this application are pointed out by the following claims.

It should be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. A diffractive optical waveguide, wherein the diffractive optical waveguide comprises:
   a waveguide substrate; and
   a plurality of functional regions located on a surface of the waveguide substrate, wherein the functional regions comprise an in-coupling grating region, a turning region, and an out-coupling grating region, the turning region is arranged in parallel with the in-coupling grating region along a first direction, and the out-coupling grating region is arranged in parallel with the turning region along a second direction; the first direction and second direction are perpendicular to each other; and
   the turning region is provided with a plurality of elliptical through holes, and the elliptical through holes are arranged at intervals and distributed in the turning region and penetrate from a top surface of the waveguide substrate to a bottom surface of the waveguide substrate; and a long axis of the elliptical through hole forms a first preset angle with the first direction, so that light that is incident to the waveguide substrate propagates along the waveguide substrate based on a preset path.

2. The diffractive optical waveguide according to claim 1, wherein a length of the plurality of elliptical through holes in the first direction is smaller than a length of the out-coupling grating region; and a length of the plurality of elliptical through holes in the second direction is greater than or equal to a width of the in-coupling grating region.

3. The diffractive optical waveguide according to claim 1, wherein a reflective inclined plane is disposed in the in-coupling grating region, the reflective inclined plane extends to an inside of the waveguide substrate along the surface of the waveguide substrate, and the reflective inclined plane forms a second preset angle with the first direction, so that light is coupled out of the out-coupling grating region after passing through the reflective inclined plane.

4. The diffractive optical waveguide according to claim 1, wherein in-coupling gratings are disposed in the in-coupling grating region, and a direction of grating diffraction fringes of the in-coupling gratings is perpendicular to the first direction; and the in-coupling gratings are configured to couple light into the diffractive optical waveguide, so that light is coupled out of the out-coupling grating region after passing through the turning region.

5. The diffractive optical waveguide according to claim 3, wherein the second preset angle is 0° to 60°.

6. The diffractive optical waveguide according to claim 3, wherein a shape of the in-coupling grating region and a shape of the out-coupling grating region are any one of a square, a rectangle, a trapezoid, and a quadrangle.

7. The diffractive optical waveguide according to claim 6, wherein out-coupling gratings are disposed in the out-coupling grating region, and a direction of grating diffraction fringes of the out-coupling gratings is parallel to the first direction.

8. The diffractive optical waveguide according to claim 7, wherein the in-coupling gratings and the out-coupling gratings are holographic gratings or surface relief gratings.

9. The diffractive optical waveguide according to claim 8, wherein an etching depth of the in-coupling grating and an etching depth of the out-coupling grating are the same, and the etching depth is less than 800 nm.

10. The diffractive optical waveguide according to claim 9, wherein the in-coupling grating region and the out-coupling grating region are located on a same side or different sides of the surface of the waveguide substrate.

11. The diffractive optical waveguide according to claim 10, wherein the first preset angle is 90° to 180°.

12. The diffractive optical waveguide according to claim 11, wherein a length of a long axis of the elliptical through hole is 0.1 mm to 3 mm; and a length of a short axis of the elliptical through hole is 0.01 mm to 3 mm.

13. The diffractive optical waveguide according to claim 12, wherein an interval between the elliptical through holes in the first direction is 0 mm to 10 mm; and an interval between the elliptical through holes in the second direction is 0 mm to 2 mm.

14. Augmented reality glasses, comprising:
a frame and a support leg, wherein one end of the support leg is connected to the frame; and
a diffractive optical waveguide, comprising:
a waveguide substrate; and
a plurality of functional regions located on a surface of the waveguide substrate, wherein the functional regions comprise an in-coupling grating region, a turning region, and an out-coupling grating region, the turning region is arranged in parallel with the in-coupling grating region along a first direction, and the out-coupling grating region is arranged in parallel with the turning region along a second direction; the first direction and second direction are perpendicular to each other; and
the turning region is provided with a plurality of elliptical through holes, and the elliptical through holes are arranged at intervals and distributed in the turning region and penetrate from a top surface of the waveguide substrate to a bottom surface of the waveguide substrate; and a long axis of the elliptical through hole forms a first preset angle with the first direction, so that light that is incident to the waveguide substrate propagates along the waveguide substrate based on a preset path.

15. An augmented reality display device, comprising:
a display and a diffractive optical waveguide, wherein the display corresponds to a position of an in-coupling grating region of the diffractive optical waveguide,
wherein the diffractive optical waveguide comprises:
a waveguide substrate; and
a plurality of functional regions located on a surface of the waveguide substrate, wherein the functional regions comprise an in-coupling grating region, a turning region, and an out-coupling grating region, the turning region is arranged in parallel with the in-coupling grating region along a first direction, and the out-coupling grating region is arranged in parallel with the turning region along a second direction; the first direction and second direction are perpendicular to each other; and
the turning region is provided with a plurality of elliptical through holes, and the elliptical through holes are arranged at intervals and distributed in the turning region and penetrate from a top surface of the waveguide substrate to a bottom surface of the waveguide substrate; and a long axis of the elliptical through hole forms a first preset angle with the first direction, so that light that is incident to the waveguide substrate propagates along the waveguide substrate based on a preset path.

16. The augmented reality display device according to claim 15, wherein a length of the plurality of elliptical through holes in the first direction is smaller than a length of the out-coupling grating region; and a length of the plurality of elliptical through holes in the second direction is greater than or equal to a width of the in-coupling grating region.

17. The augmented reality display device according to claim 15, wherein a reflective inclined plane is disposed in the in-coupling grating region, the reflective inclined plane extends to an inside of the waveguide substrate along the surface of the waveguide substrate, and the reflective inclined plane forms a second preset angle with the first direction, so that light is coupled out of the out-coupling grating region after passing through the reflective inclined plane.

18. The augmented reality display device according to claim 15, wherein in-coupling gratings are disposed in the in-coupling grating region, and a direction of grating diffraction fringes of the in-coupling gratings is perpendicular to the first direction; and the in-coupling gratings are configured to couple light into the diffractive optical waveguide, so that light is coupled out of the out-coupling grating region after passing through the turning region.

19. The augmented reality display device according to claim 17, wherein the second preset angle is 0° to 60°.

20. The diffractive optical waveguide according to claim 17, wherein a shape of the in-coupling grating region and a shape of the out-coupling grating region are any one of a square, a rectangle, a trapezoid, and a quadrangle.

* * * * *